United States Patent Office 3,075,852
Patented Jan. 29, 1963

3,075,852
FINGERPRINTING

Matthew J. Bonora, 3162 Hickory St., Wantagh, N.Y.
No Drawing. Filed Aug. 12, 1959, Ser. No. 833,135
23 Claims. (Cl. 117—.5)

The present invention relates to the art of fingerprinting and is particularly concerned with an improved system for detecting and developing latent fingerprints.

The conventional procedure for developing a latent fingerprint involves applying to the surface having such fingerprint thereon a small amount of a finely powdered solid material until the outline of the fingerprint becomes visible and then carefully spreading the applied powder over the fingerprint in order to bring out its pattern. Such powdered material is applied to the surface with a fine brush, which is also used to subsequently spread such powdered material across the fingerprint. Various substances including powdered metals such as aluminum and bronze, dragon's blood powder, a gray powder consisting of finely ground French chalk and mercury, and a black powder having a lampblack or charcoal base may be employed for this purpose. Once the latent fingerprint has been developed, it can be suitably photographed and, if desired, lifted so as to be appropriately preserved.

Despite its widespread usage, however, this procedure suffers a number of serious disadvantages. The detection of a latent fingerprint in this manner is a very painstaking and time-consuming matter; and more than considerable skill is required in properly "brushing up" the initially detected fingerprint in order to avoid damage to the fingerprint pattern or loss of the fingerprint impression altogether. The use of too great an amount of powder must be carefully avoided; for otherwise the excess powder may completely destroy the fingerprint impression during the brushing-up operation. In addition, it will be at once apparent that this technique can only be used where it is possible to satisfactorily apply the powder to the surface and that such procedure can be utilized only with extreme difficulty, if at all, on vertically arranged surfaces or on downwardly facing surfaces such as ceilings.

I have now found that these difficulties of such conventional procedure can be entirely eliminated with the production of a developed latent fingerprint of unusual quality. No longer is it necessary to employ only skilled operators in the detection of latent fingerprints; for my invention can be put into practice without any particular skill or specific ability. My improved technique does not require the exercise of any particular care in the application of the powdered material to the surface having the latent fingerprint thereon; and the latent fingerprint can be easily detected and developed regardless of the position of the surface having the same thereon. Moreover, the procedure of the present invention can be carried out very rapidly so that even an unskilled operator will experience no undue difficulty in detecting and developing a large number of latent fingerprints in the time usually required to detect and develop a single latent fingerprint in the customary manner.

The foregoing advantages are achieved in accordance with the invention by providing a composition which comprises a finely divided solid material of at most 50-mesh size and a propellant adapted to propel the solid material at a pressure greater than atmospheric pressure. This composition is advantageously utilized simply by spraying the same onto a surface having a latent fingerprint thereon in order to detect and/or develop the same. This method of application of the composition is best carried out by providing a pressure-tight container charged with the composition and having an outlet provided with a valve formed with an opening through which the composition is sprayed.

As indicated above, the present composition consists basically of a finely divided solid material and a propellant. The finely divided solid material may be any powdered or pulverulent substance which is suitable for use in the detection of latent fingerprints. Many such materials are known; and any such fingerprint powder can be used provided, of course, that it has a color contrasting sufficiently with that of the surface having the latent fingerprint thereon so that the developed fingerprint will stand out satisfactorily. Typical of such substances are powdered aluminum and powdered bronze, carbon black, mixtures of powdered aluminum and carbon black, dragon's blood, talc, French chalk and the like. The size of the particles of the fingerprint powder should be no greater than 50 mesh and preferably less than about 325–400 mesh, however, since otherwise the particles tend to fill in the latent fingerprint and obliterate it so that reproduction of the same becomes difficult if not impossible.

The propellant may be normally gaseous, that is, a propellant which is a gas at room temperature (65° F.) and atmospheric pressure. Such a propellant should also be liquefiable at slightly increased pressures so that it can be employed safely in conventional metal or other containers adapted for dispensing an aerosol. Suitable gaseous materials which can be liquefied and employed as a propellant in the present invention include the lower aliphatic hydrocarbons such as propane and the butanes, the lower alkyl halides such as methyl or ethyl chloride, and the fluorinated and fluorochlorinated lower alkanes. The fluorinated and fluorochlorinated alkanes having up to 2 carbon atoms are particularly preferred, either alone or in admixture, typical examples comprising monochlorotrifluoromethane (Freon 13), dichlorodifluoromethane (Freon 12), trichloromonofluoromethane (Freon 11), monochlorodifluoromethane (Freon 22), dichloromonofluoromethane (Freon 21), dichlorotetrafluoroethane (Freon 114), and trichlorotrifluoroethane (Freon 113). These fluorinated and fluorochlorinated alkanes are also available under the trademarks "Genetron," "Isotron" and "Ucon."

Desirably, a normally gaseous propellant should be so selected that its vapor pressure at room temperature is below about 90 pounds per square inch gauge. Such pressure can be readily attained with a one-component propellant of this type; but I have found that more latitude is possible if a multi-component propellant of this type is employed. Mixtures of dichlorodifluoromethane and dichlorotetrafluoroethane are especially useful in this connection since they provide a wide variety of spraying pressures.

I have also found that a readily volatilizable normally liquid substance can be used as a diluent for such a liquefied normally gaseous propellant in order to alter the volatility of the latter. Such diluent may comprise any liquid which has a relatively high volatility at room temperature and atmospheric pressure and may typically comprise an alkyl halide such as methylene chloride, trichloroethylene, methyl chloroform, perchloroethylene, carbon tetrachloride, and ethylene dichloride.

Tests have shown that good results are obtained when the present composition contains up to 25% by weight of the powdered or finely divided solid material. If more than about 25% by weight of the fingerprint powder is used, then, while fair results may be achieved, it becomes increasingly more difficult to secure uniform, satisfactory development of latent fingerprints. Particularly advantageous results are obtained when no more than about 15% by weight of the finely divided solid material is employed.

I have found, in accordance with the invention, that when powders of the type hereinbefore mentioned are provided within the stated mesh range and are sprayed by means of suitable propellant formulations from a container, the particles of powder adhere closely and firmly to the latent fingerprint without disturbing or altering the print. Surprisingly, by spraying the powdered material under pressure onto a suspected area, the undesirable effect of "filling in" the latent print, or altering it, is eliminated since I have found that the excess powder, if any, can be easily removed, as for example by brushing with a suitable brush. Thus, by first spraying a powdered material over a small or large suspected area, as the case may be, followed by brushing, if an excess of powdered material has been deposited, an extremely clear and readable print will be developed which can be photographed or lifted for evidentiary purposes, if desired.

For developing latent fingerprints on dark backgrounds, I preferably utilize finely divided aluminum powder. Carbon black, for example, can be used against light backgrounds.

The propellant selected is charged within a suitable pressure-tight container together with the powdered material which is adapted to be discharged in the form of a fine spray from the container upon actuation of a valve with which the container is fitted. Desirably, the valve may have an opening between 0.010" and 0.030". It will be obvious, however, that other size valve openings can be used and that the particular valve opening selected is governed in part by the particle size of the powder to be sprayed from the container. Preferably, I spray the powdered material under a pressure, at room temperature, no greater than 60 p.s.i.g. onto the suspected area. The pressure under which the powdered material is sprayed depends primarily on the propellant which is selected and, if utilized, the diluent included.

The following are examples of formulations which can be used in carrying out the invention. It is to be understood, however, that these examples are merely illustrative and therefore the invention is not to be construed as limited to the precise examples or quantities set forth therein. Furthermore, while the invention may be practiced in developing latent fingerprints on porous surfaces, it is particularly advantageous when developing latent fingerprints on non-porous surfaces. All quantities in the following examples are by weight.

*Examples I–III*

Good adherence of the fingerprint powder to the latent fingerprint with good reproduction of the fingerprint pattern is obtained with each of the following compositions:

| | I, percent | II, percent | III, percent |
|---|---|---|---|
| Aluminum powder (less than 325 mesh) | 3 | 0.5 | 0.1 |
| Freon 114 | 87 | 72 | 72 |
| Freon 12 | 10 | 27.5 | 27.9 |

The spraying pressure generated with the formulation of Example I is about 21 p.s.i.g. at room temperature, and that with the formulations of Examples II and III is about 32 p.s.i.g.

*Examples IV–VI*

Good adherence of the fingerprint powder to the latent fingerprint with excellent and clear reproduction of the fingerprint pattern is achieved with each of the following compositions:

| | IV, percent | V, percent | VI, percent |
|---|---|---|---|
| Aluminum powder (less than 325 mesh) | 5 | 5 | 1 |
| Carbon black (less than 325 mesh) | | | 4 |
| Freon 11 | 35 | 55 | 55 |
| Freon 12 | 60 | 40 | 40 |

Formulation IV generates a pressure of about 30–35 p.s.i.g. at room temperature, and formulations V and VI generate a pressure of about 32 p.s.i.g.

*Examples VII–IX*

Excellent results are obtained with each of the following formulations:

| | VII, percent | VIII, percent | IX, percent |
|---|---|---|---|
| Aluminum powder (less than 325 mesh) | 3 | 0.6 | |
| Carbon black (less than 325 mesh) | | 2.4 | 3 |
| Freon 114 | 70 | 70 | 70 |
| Freon 12 | 27 | 27 | 27 |

Each of these formulations, when utilized, generates a spraying pressure of about 30–34 p.s.i.g. at room temperature.

*Example X*

Dragon's blood powder (less than 50 mesh size) can be substituted for the aluminum powder in Example VII or the carbon black in Example IX with good results.

*Example XI*

A similar substitution of dragon's blood powder for the carbon black in Example VIII can also be made with good results.

*Example XII*

A formulation providing good reproduction of a latent fingerprint pattern comprises the following:

| | Percent |
|---|---|
| Aluminum powder (less than 325 mesh) | 3 |
| Freon 114 | 95 |
| Freon 12 | 2 |

This formulation generates a pressure of about 15 p.s.i.g. at room temperature.

*Example XIII*

Carbon black (less than 325 mesh) can be substituted with good fingerprint pattern reproduction for the aluminum powder of Example XII.

*Example XIV*

Good fingerprint pattern reproduction can also be obtained with the following formulation:

| | Percent |
|---|---|
| Aluminum powder (less than 325 mesh) | 15 |
| Freon 11 | 10 |
| Freon 12 | 75 |

A pressure of about 55 p.s.i.g. at room temperature is generated when this formulation is utilized.

*Examples XV–XVII*

Good results are obtained with each of the following formulations:

| | XV, percent | XVI, percent | XVII, percent |
|---|---|---|---|
| Aluminum powder (less than 325 mesh) | 15 | 15 | 15 |
| Freon 114 | 42.5 | 75 | 10 |
| Freon 12 | 42.5 | 10 | 75 |

*Examples XVIII and XIX*

The formulation of Example VII or VIII may be satisfactorily modified by replacing half of the Freon 114 by methylene chloride as follows:

| | XVIII, percent | XIX, percent |
|---|---|---|
| Aluminum powder (less than 325 mesh) | 3 | 0.6 |
| Carbon black (less than 325 mesh) | | 2.4 |
| Methylene chloride | 35 | 35 |
| Freon 114 | 35 | 35 |
| Freon 12 | 27 | 27 |

*Example XX*

The following formulation illustrates the use of a typical one-component propellant:

| | Percent |
|---|---|
| Aluminum powder (less than 325 mesh) | 3 |
| Freon 11 | 97 |

A pressure of about 2 p.s.i.g. at room temperature is obtained.

*Example XXI*

Example VIII may be satisfactorily modified by utilizing 0.3% of the aluminum powder and 2.7% of the carbon black as the finely divided solid material.

To improve adhesion of the powdered material to the surface onto which it is applied, I may include a small quantity, e.g., up to 4% by weight of the powder of an adhesion-promoting material as, for example, a free fatty acid, such as stearic acid.

It will be appreciated that, if desired, the present invention can be also utilized in the mere detection of a latent fingerprint in contrast to the development of the latent fingerprint with the view of its photographic or other reproduction.

While the invention has been described with respect to the detection and/or development of latent fingerprints, it will be obvious that it also applies to the detection and/or development of, for example, latent footprints, latent palm prints and, for that matter, any latent print which is subject to detection and/or development.

Since various modifications of the invention may be made wthout departing from the spirit thereof, it is intended not to be restricted to the embodiments specfically descrbed but rather to the invention and all equivalents thereof, as defined in the appended claims.

I claim:

1. A composition of matter consisting essentially of up to 15% by weight of a finely divided solid material comprising a fingerprint developer powder of at most 50-mesh size in admixture with a liquefied normally gaseous propellant.

2. A composition according to claim 1, in which the propellant comprises at least one substance selected from the group consisting of fluorinated and fluorochlorinated alkanes having up to 2 carbon atoms.

3. A composition according to claim 2, in which the propellant is a mixture of dichlorodifluoromethane and dichlorotetrafluoroethane.

4. A composition according to claim 1, in which the solid material comprises a material selected from the group consisting of aluminum, carbon black, mixtures thereof, and dragon's blood.

5. A composition according to claim 4, in which the solid material includes a small quantity of stearic acid.

6. A composition of matter consisting essentially by weight of about 3% of a finely divided solid material comprising a fingerprint developer powder of at most 50-mesh size in admixture with about 27% of liquefied dichlorodifluoromethane and about 70% of liquefied dichlorotetrafluoroethane, said solid material having a color contrasting with that of the surface to which it is adapted to be applied.

7. A composition according to claim 6, in which the solid material comprises a material selected from the group consisting of aluminum, carbon black, mixtures thereof, and dragon's blood.

8. A composition of matter consisting essentially of up to 15% by weight of a finely divided solid material comprising a fingerprint developer powder of at most 50-mesh size in admixture with a liquefied normally gaseous propellant, and a readily volatilizable normally liquid diluent.

9. A composition of matter consisting essentially by weight of about 3% of a finely divided solid material comprising a fingerprint developer powder of at most 50-mesh size and in admixture with about 27% of liquefied dichlorodifluoromethane, about 35% of liquefied dichlorotetrafluoroethane, and about 35% of a readily volatilizable normally liquid alkyl halide, said solid material having a color contrasting with that of the surface to which it is adapted to be applied.

10. A method of detecting or developing a latent fingerprint on a surface, which comprises directing a spray against a surface having a latent fingerprint thereon from a sealed container having a composition comprising a finely divided solid material of at most 50-mesh size and a propellant sealed from the atmosphere, and distributing the excess finely divided solid material in order to expose the developed fingerprint.

11. A method according to claim 10, in which the propellant is a liquefied normally gaseous propellant.

12. A method according to claim 11, in which the liquefied normally gaseous propellant is vaporized by discharging an admixture of the finely divided solid material with the liquefied normally gaseous propellant from a container containing such admixture.

13. A method of detecting or developing a latent fingerprint on a surface, which comprises directing a spray against a surface having a latent fingerprint thereon from a sealed container having a composition consisting essentially of up to 15% by weight of a finely divided solid material of at most 50-mesh size in admixture with a normally gaseous propellant at least until such fingerprint becomes discernible, and distributing the excess finely divided solid material in order to expose the developed fingerprint.

14. A method according to claim 13, in which the propellant comprises at least one substance selected from the group consisting of fluorinated and fluorochlorinated alkanes having up to 2 carbon atoms.

15. A method according to claim 14, in which the propellant is a mixture of dichlorodifluoromethane and dichlorotetrafluoroethane.

16. A method according to claim 13, in which the solid material comprises a material selected from the group consisting of aluminum, carbon black, mixtures thereof, and dragon's blood.

17. A method of detecting or developing a latent fingerprint on a surface, which comprises directing a spray against a surface having a latent fingerprint thereon from a sealed container having a composition consisting essentially by weight of about 3% of a finely divided solid material of at most 50-mesh size in admixture with about 27% of dichlorodifluoromethane and about 70% of dichlorotetrafluoroethane at least until such fingerprint becomes discernible, and distributing the excess finely divided solid material in order to expose the developed fingerprint.

18. A method according to claim 17, in which the solid material comprises a material selected from the group consisting of aluminum, carbon black, mixtures thereof, and dragon's blood.

19. A method of developing latent fingerprints on a surface, which comprises spraying from a container containing a dispersion of powdered material in a liquefied normally gaseous propellant an excess of the powder in a finely divided form onto said surface, and brushing excess powder from said surface.

20. A self-contained unit which consists essentially of an admixture of a finely divided solid material comprising a fingerprint developer powder of at most 50-mesh size with a liquefied normally gaseous propellant contained in a pressure-tight container having an outlet provided with a valve formed with an opening through which such admixture can be sprayed against the surface.

21. A self-contained unit which consists essentially of an admixture of up to 15% by weight of a finely divided solid material comprising a fingerprint developer powder of at most 50-mesh size with a liquefied normally gaseous propellant contained in a pressure-tight container having an outlet provided with a valve adapted to furnish an opening through which such admixture can be sprayed against the surface.

22. A self-contained unit consisting essentially of an admixture by weight of about 3% of a finely divided solid material comprising a fingerprint developer powder of at most 50-mesh size with about 27% of liquefied dichlorodifluoromethane and about 70% of liquefied dichlorotetrafluoroethane contained in a pressure-tight container having an outlet provided with a valve adapted to furnish an opening through which such admixture can be sprayed against the surface.

23. A composition of matter comprising as a first constituent a finely divided powdered material comprising a fingerprint developer powder no greater than 50-mesh in size and as a second constituent a liquefied normally gaseous propellant sealed from the atmosphere, said propellant being adapted to propel the powdered material at a pressure greater than atmospheric pressure.

References Cited in the file of this patent

UNITED STATES PATENTS

| | | |
|---|---|---|
| 1,497,972 | Bock | June 17, 1924 |
| 1,833,287 | Hadley | Nov. 24, 1931 |
| 2,774,628 | Engstrum | Dec. 18, 1956 |
| 2,914,221 | Rosenthal | Nov. 24, 1959 |
| 2,959,325 | Beard | Nov. 8, 1960 |